(12) United States Patent
Ishizuka et al.

(10) Patent No.: US 9,498,755 B2
(45) Date of Patent: Nov. 22, 2016

(54) GAS SEPARATION MEMBRANE, METHOD OF PRODUCING THE SAME, AND GAS SEPARATING MEMBRANE MODULE USING THE SAME

(71) Applicant: FUJIFILM Corporation, Minato-ku, Tokyo (JP)

(72) Inventors: Kenichi Ishizuka, Ashigarakami-gun (JP); Shigehide Itou, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/287,273

(22) Filed: May 27, 2014

(65) Prior Publication Data

US 2014/0260986 A1 Sep. 18, 2014

Related U.S. Application Data

(63) Continuation of application No. PCT/JP2012/080351, filed on Nov. 22, 2012.

(30) Foreign Application Priority Data

Nov. 25, 2011 (JP) ................. 2011-258325

(51) Int. Cl.
  *B01D 53/22* (2006.01)
  *B01D 71/58* (2006.01)
  (Continued)

(52) U.S. Cl.
  CPC ............. *B01D 71/58* (2013.01); *B01D 53/228* (2013.01); *B01D 67/0002* (2013.01);
  (Continued)

(58) Field of Classification Search
  CPC ................... B01D 53/22; B01D 69/12; B01D 71/16; B01D 71/52; B01D 71/56;
  (Continued)

(56) References Cited

U.S. PATENT DOCUMENTS 4,528,004 A 7/1985 Makino et al.
5,156,740 A * 10/1992 Bruschke ...................... 210/490
(Continued)

FOREIGN PATENT DOCUMENTS

JP 51121003 A 10/1976
JP 58-11006 A 1/1983
(Continued)

OTHER PUBLICATIONS

"coating" Random House Kernerman Webster's College Dictionary, 2010 Random House, Inc. <http://www.thefreedictionary.com/coating>.*

(Continued)

*Primary Examiner* — Anthony Shumate
(74) *Attorney, Agent, or Firm* — Sughrue Mion, PLLC

(57) ABSTRACT

A gas separation membrane containing a support and a separating layer formed on the support,
  the separating layer containing a main body and a hydrophilic layer;
  the main body being disposed on the side of the support;
  the hydrophilic layer being disposed on the far side of the support and containing a hydrophilic polymer.

8 Claims, 1 Drawing Sheet

(51) Int. Cl.

| | | |
|---|---|---|
| *B01D 69/10* | (2006.01) | |
| *B01D 67/00* | (2006.01) | |
| *B01D 69/12* | (2006.01) | |
| *B01D 71/64* | (2006.01) | |
| *B01D 71/08* | (2006.01) | |
| *B01D 71/16* | (2006.01) | |
| *B01D 71/44* | (2006.01) | |
| *B01D 71/52* | (2006.01) | |
| *B01D 71/56* | (2006.01) | |
| *B01D 71/42* | (2006.01) | |

(52) U.S. Cl.
CPC ............ *B01D 69/10* (2013.01); *B01D 69/12* (2013.01); *B01D 71/64* (2013.01); *B01D 53/22* (2013.01); *B01D 71/08* (2013.01); *B01D 71/16* (2013.01); *B01D 71/42* (2013.01); *B01D 71/44* (2013.01); *B01D 71/52* (2013.01); *B01D 71/56* (2013.01); *B01D 2053/221* (2013.01); *B01D 2257/504* (2013.01); *B01D 2325/36* (2013.01); *Y02C 10/10* (2013.01)

(58) Field of Classification Search
CPC ............ B01D 71/64; B01D 71/70; B01D 53/228; B01D 67/0002; B01D 69/10; B01D 71/58; B01D 2053/221; B01D 2257/504; B01D 2325/36; B01D 71/08; B01D 71/42; B01D 71/44; Y02C 10/10
See application file for complete search history.

(56) References Cited

U.S. PATENT DOCUMENTS

| | | | | |
|---|---|---|---|---|
| 7,767,776 | B2* | 8/2010 | Blom et al. | .................... 526/280 |
| 8,205,754 | B2* | 6/2012 | Hanakawa | ......... B01D 67/0009 |
| | | | | 210/490 |
| 8,222,166 | B2* | 7/2012 | Chu et al. | .................... 442/153 |
| 9,162,178 | B2* | 10/2015 | Hiraki | ................. B01D 53/228 |
| 2009/0191398 | A1* | 7/2009 | Moore et al. | ............. 428/315.5 |
| 2010/0151188 | A1* | 6/2010 | Ishizuka | ................ B32B 15/08 |
| | | | | 428/119 |
| 2010/0323573 | A1* | 12/2010 | Chu et al. | .................... 442/153 |
| 2011/0036237 | A1* | 2/2011 | Okada et al. | ..................... 95/51 |
| 2011/0052868 | A1* | 3/2011 | Itou | .......................... C08J 7/045 |
| | | | | 428/141 |
| 2012/0285881 | A1* | 11/2012 | Jikihara et al. | ............... 210/490 |
| 2013/0000724 | A1* | 1/2013 | Itou | .......................... C08J 7/045 |
| | | | | 136/256 |
| 2013/0062285 | A1* | 3/2013 | Hoek et al. | .................... 210/650 |
| 2014/0130667 | A1* | 5/2014 | Sano et al. | ......................... 95/51 |
| 2014/0130668 | A1* | 5/2014 | Sano et al. | ......................... 95/51 |
| 2014/0130669 | A1* | 5/2014 | Sano et al. | ......................... 95/51 |
| 2014/0208949 | A1* | 7/2014 | Ishizuka et al. | .................. 96/14 |
| 2014/0345462 | A1* | 11/2014 | Itou | ....................... B01D 69/12 |
| | | | | 96/13 |
| 2015/0086801 | A1* | 3/2015 | Hiraki | ..................... B01J 20/02 |
| | | | | 428/500 |
| 2015/0151244 | A1* | 6/2015 | Ishizuka | ................ B01D 53/22 |
| | | | | 422/212 |
| 2015/0182917 | A1* | 7/2015 | Hosoya | ............... B01D 63/106 |
| | | | | 422/617 |
| 2016/0008766 | A1* | 1/2016 | Aburaya | ............... B01D 63/10 |
| | | | | 422/222 |

FOREIGN PATENT DOCUMENTS

| | | |
|---|---|---|
| JP | 5895539 A | 6/1983 |
| JP | 62-91543 A | 4/1987 |
| JP | 62-227422 A | 10/1987 |
| JP | 63-194701 A | 8/1988 |
| JP | 3178324 A | 8/1991 |
| JP | 4-27427 A | 1/1992 |
| JP | 6-154541 A | 6/1994 |
| JP | 8-24602 A | 1/1996 |
| JP | 9-225273 A | 9/1997 |
| JP | 10-99666 A | 4/1998 |
| JP | 11-76778 A | 3/1999 |
| JP | 2005-254087 A | 9/2005 |
| JP | 2006-130453 A | 5/2006 |
| JP | 2006-297335 A | 11/2006 |
| JP | 2007-297605 A | 11/2007 |
| WO | 2009/142279 A1 | 11/2009 |

OTHER PUBLICATIONS

Communication dated Jun. 23, 2015 from the Japanese Patent Office issued in corresponding application No. 2011258325, 6 pgs.
Communication dated Feb. 2, 2016, issued by the Japan Patent Office in corresponding Japanese Application No. 2011-258325, 4pgs.

* cited by examiner

GAS SEPARATION MEMBRANE, METHOD OF PRODUCING THE SAME, AND GAS SEPARATING MEMBRANE MODULE USING THE SAME

CROSS-REFERENCE TO RELATED APPLICATIONS

This application is a Continuation of PCT International Application No. PCT/JP2012/080351 filed on Nov. 22, 2012, which claims priority under 35 U.S.C. §119 (a) to Japanese Patent Application No. 2011-258325 filed on Nov. 25, 2011. Each of the above applications is hereby expressly incorporated by reference, in its entirety, into the present application.

FIELD OF THE INVENTION

The present invention relates to a gas separation membrane, a method of producing the same, and a gas separating membrane module using the same.

BACKGROUND OF THE INVENTION

There is a separation membrane composed of a specific polymer compound, to perform in selective permeation of a desired gas component and thereby separating it. As specific industrial application thereof, relating to a global warming issue, studies have been carried out for separating and recovering carbon dioxide from a large-scale carbon dioxide source, e.g., a thermal power station, a cement plant, and a blast furnace in a steel plant. Such membrane separation technique purportedly attracts attention, for the solution of an environmental issue, as a means for achieving the operation with relatively small energy. Meanwhile, natural gas or bio gas (gases generated by fermentation and anaerobic digestion of excreta of organisms, organic fertilizers, biodegradable substances, polluted water, garbages, energy crops, and the like) is mainly composed of a mixed gas of methane and carbon dioxide. For removing carbon dioxide from the above described mixed gas, a gas separation method by using a membrane has been studied (see Patent Literature 1, Patent Literature 2 and the like).

On the other hand, in the mixed gas to which the separating operation above is applied, a considerable amount of moisture is often contained. The separation membrane to be applied there hence needs to be protected against the moisture. From this viewpoint, it is proposed to modify the surface of such a gas separation membrane to which a hydrophobic property is imparted (see Patent Literatures 3).

CITATION LIST

Patent Literatures

Patent Literature 1: JP-A-2007-297605 ("JP-A" means unexamined published Japanese patent application)
Patent Literature 2: JP-A-2006-297335
Patent Literature 3: JP-A-08-24602

SUMMARY OF THE INVENTION

Problems that the Invention is to Solve

The present inventors confronted to a technical problem upon particularly separating carbon dioxide from methane or the like. They hence pursued a purported membrane, through investigation and analysis, widely as to separating characteristics, property variation, or separation behavior, including research on a raw material or the like. Then, the present inventors eventually reached the conclusion in that, as an influencing factor in the mixed gas of this system to vary the life of a gas separation membrane, but not the moisture, rather BTX (benzene, toluene, xylene organic components) would relate to it. Particularly, the present inventors ascertained the following facts. That is, the influence of BTX is significant to a raw material of the membrane that relies on a dissolution and diffusion mechanism for gas separation. In a specific embodiment, when a separation membrane is constituted by a layer of hydrophilic polymer on its surface side, the membrane life is consequently prolonged with high its gas separating characteristics being maintained.

In view of the above-described respects, the present invention addresses the provision of a gas separation membrane that can realize excellent gas permeability and a high gas separation selectivity, with prolonged membrane life with regard to the separation of a mixed gas involving BTX. Further, the present invention addresses the provision of a method of producing the gas separation membrane, and a gas separating membrane module using the same.

Means to Solve the Problem

The problems of the present invention can be solved by the following means.

{1} A gas separation membrane containing a support and a separating layer formed on the support,
the separating layer containing a main body and a hydrophilic layer;
the main body being disposed on the side of the support;
the hydrophilic layer being disposed on the far side of the support and containing a hydrophilic polymer.

{2} The gas separation membrane according to item {1}, wherein the hydrophilic polymer includes at least one selected from the group comprising of polyvinyl alcohol, polyacrylic acid, polystyrene sulfonic acid, polyacrylamide, polyethylene glycol, polysaccharides, and gelatin.

{3} The gas separation membrane according to any one of item {1} or {2}, wherein the polysaccharides is agarose, dextran, chitosan or cellulose.

{4} The gas separation membrane according to any one of items {1} to {3}, wherein the hydrophilic layer has a film thickness of 0.5 μm or less.

{5} The gas separation membrane according to any one of items {1} to {4}, containing the hydrophilic layer provided with a surface contact angle measured by using water thereon in the range of 60 degrees or less.

{6} The gas separation membrane according to any one of items {1} to {5}, wherein a difference ($\alpha_i - \alpha_s$) between a surface contact angle ($\alpha_s$) of water on the hydrophilic layer and a contact angle ($\alpha_i$) of water on the main body of separating layer is 10 degrees or more.

{7} The gas separation membrane according to any one of items {1} to {6}, further containing a mixed layer between the hydrophilic layer and the main body of separating layer, the mixed layer mixedly containing the constituent component of the hydrophilic layer and the constituent component of the main body of separating layer.

{8} The gas separation membrane according to any one of items {1} to {7}, wherein the main body of separating layer has a film thickness of 0.05 μm to 20 μm.

{9} The gas separation membrane according to any one of items {1} to {8},
wherein a resin constituting the main body of separating layer is selected from the group consisting of a polyimide resin, a polyamide resin, a cellulose resin, a polydimethylsiloxane resin, or a polyethylene glycol resin.

{10} The gas separation membrane according to any one of items {1} to {9},
wherein the mixed layer has a thickness of 0.01 µm to 1 µm.

{11} A method of producing a gas separation membrane,
the gas separation membrane containing a support and a separating layer formed on the support, the separating layer containing a main body and a hydrophilic layer, the main body being disposed on the side of the support, the hydrophilic layer being disposed on the far side of the support and containing a hydrophilic polymer,
the method containing the steps of:
preparing a solution of the hydrophilic polymer for forming the hydrophilic layer;
preparing a solution of the resin for forming the main body of separating layer; and
applying the both solutions via a multilayer coating step.

{12} The method of producing a gas separation membrane according to item {11}, wherein the solution of the hydrophilic polymer for forming the hydrophilic layer is applied to the coated solution of the resin for forming the main body of separating layer, before a dry state in which the two solutions are not mixed.

{13} The method of producing a gas separation membrane according to item {11} or {12}, wherein the concentration of the hydrophilic polymer is from 0.05% by mass to 5% by mass in the solution of the hydrophilic polymer for forming the hydrophilic layer.

{14} The method of producing a gas separation membrane according to any one of items {11} to {13}, wherein the concentration of the polymer is from 0.5% by mass to 30% by mass in the solution of the polymer for forming the main body of separating layer.

{15} A gas separating membrane module, containing the gas separation membrane according to any one of items {1} to {10}.

Effects of the Invention

According to the present invention as to a gas separation membrane, a method of producing the same, and a gas separating membrane module using the same, an excellent effect can be realized such as excellent gas permeability and high gas separation selectivity, with long life to separation with regard to a mixed gas involving BTX.

Other and further features and advantages of the invention will appear more fully from the following description, appropriately referring to the accompanying drawings.

MODE FOR CARRYING OUT THE INVENTION

In the gas separation membrane of the present invention, a composite membrane, having a gas separating function, contains a support and a separating layer formed on the support. The separating layer includes a hydrophilic layer containing a hydrophilic polymer on the far (opposite) side of the support, and a main body of separating layer on the support (near) side. Hereinafter, the present invention is described in detail focusing on a preferred embodiment with referring to a drawing.

[Constitution of Composite Membrane]

Figure 1:
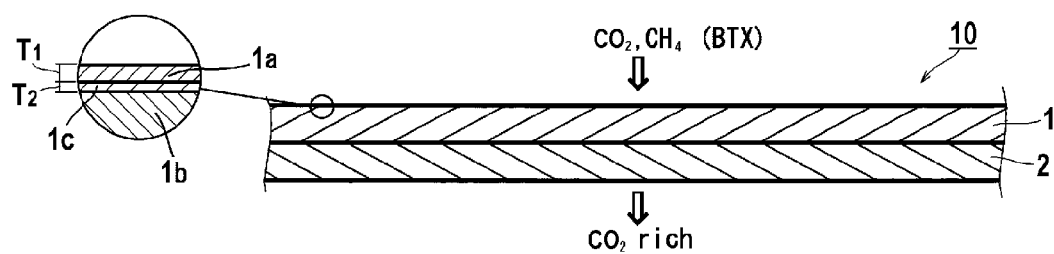
FIG. 1 is a cross section schematically illustrating an embodiment of a gas separation composite membrane according to the present invention.
Figure 2:
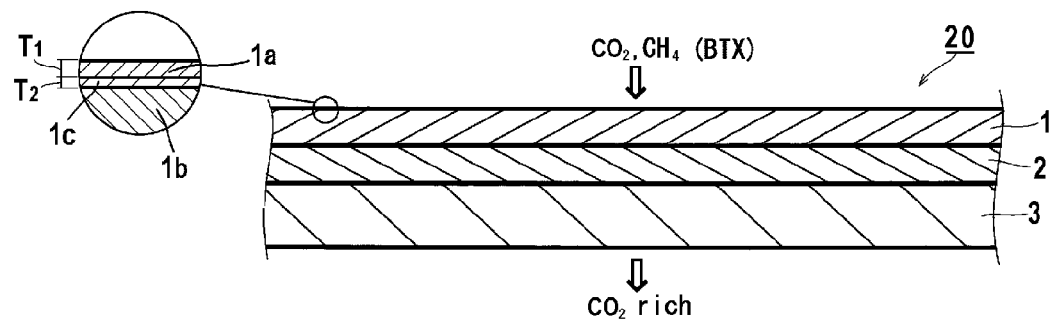
FIG. 2 is a cross section schematically illustrating another embodiment of a gas separation composite membrane according to the present invention.

FIG. 1 is a cross-sectional view schematically showing a gas separation composite membrane 10, which is a preferred embodiment according to the present invention. Reference sign 1 is a gas separating layer and reference sign 2 is a support constituted of a porous layer. FIG. 2 is a cross-sectional view schematically showing a gas separation composite membrane 20, which is a preferred embodiment according to the present invention. According to this embodiment, in addition to the gas separating layer 1 and the porous layer 2, a nonwoven fabric layer 3 is added as a support. In the composite membrane in such a form, a coating liquid (dope) forming the above-described gas separating layer is preferably coated at least on a surface of a porous support (in the specification, the term "coating" including the meaning of an embodiment in which the liquid is deposited on the surface by dipping), and the resultant coat is preferably hardened by an arbitrary method. Herein, an expression "on" the support means that any other layer may be interposed between the support and the gas separating layer. In addition, unless otherwise noted, with regard to expressions "on" and "under", a direction in which a gas to be separated is supplied is referred to as "on", and a direction from which a separated gas is discharged is referred to "under".

In gas separation composite membranes 10 and 20 according to the present embodiment, the gas separating layer has at the upper side thereof a hydrophilic layer 1a. A main body of separating layer 1b of the lower side exhibits a gas separation function, and in conjunction with a BTX shielding effect of the modification treatment surface 1a, realizes both excellent gas separation properties and long life of the membrane. Meanwhile, according to the present embodiment, a mixed layer 1c is further formed between the hydrophilic layer 1a and the separating layer b. The details of the mixed layer will be described below.

[Hydrophilic Layer]

The material that forms the hydrophilic layer 1a in the gas separation membrane of the present invention is not particularly limited, when the material includes a hydrophilic polymer. The hydrophilic layer as used herein refers to a form that may be conceived as a layer composed of particular components and having some thickness, and the hydrophilic layer may be distinguished from a treated surface formed by a dry treatment such as a plasma treatment or an electron beam treatment, a chemical treatment using a particular compound, or a graft treatment. Typically, it is preferable that the hydrophilic layer be a layer formed by applying a solution containing the resin components that will be described below. It is not necessary to have a layer adjacent to the hydrophilic layer and constituent components thereof clearly distinguished, and the component composition may change incrementally; however, a state in which the constituent components are intramolecularly modified as in the case of a graft treatment is not included.

(Hydrophilic Polymer)

In this embodiment, the hydrophilic polymer preferably contains at least one selected from polyvinyl alcohol, polyacrylic acid, polystyrene sulfonic acid, polyacrylamide, polyethylene glycol, polysaccharides, and gelatin. Examples of the polyvinyl alcohol include RS2117 (molecular weight; 74,800), PVA103 (molecular weight; 13,200, saponification degree; 98-99), PVA117 (molecular weight; 74,800, saponification degree; 98-99), PVA-HC (saponification degree; 99.85 or more), PVA-205C (molecular weight; 22,000, high purity, saponification degree; 87-89), M-205 (molecular weight; 22,000, saponification degree; 87-89), and M-115 (molecular weight; 66,000, saponification degree; 97-98) <each trade name, manufactured by KURARAY CO., LTD.>. Examples of the polysaccharides include agarose, dextran, chitosan and cellulose. Examples of the agarose include UM-11 ZY-6 and SY-4 manufactured by Ina Food Industry Co., Ltd. Examples of the dextran include 00891 manufactured by Aldrich. Examples of the chitosan include 740179 manufactured by Aldrich. Examples of the cellulose include L-70 and LT-105 manufactured by Daicel Corporation.

Polysaccharides or gelatin may be used as derivatives thereof, and examples thereof typically include, but are not particularly limited to, compounds having arbitrary substituents introduced therein. Among them, from the viewpoint of imparting hydrophilicity, preferred examples of the substituent include a carboxyl group, a phosphonyl group, a phosphoryl group, a sulfo group, a boric acid group, a hydroxyl group, and an amino group.

(Molecular Weight)

The molecular weight of the hydrophilic polymer of the present embodiment is not particularly limited, but in the present invention, what are usually classified as oligomers are also included in the hydrophilic polymer. Specifically, the molecular weight of the hydrophilic polymer is preferably, as the mass average molecular weight, from $1.0 \times 10^4$ to $1.0 \times 10^7$, more preferably from $1.0 \times 10^4$ to $5.0 \times 10^6$. When this molecular weight is adjusted to a value higher than or equal to the lower limit, defects due to cissing or the like can be reduced, and the performance can be stabilized, which is preferable. On the other hand, when the molecular weight is adjusted to a value lower than or equal to the upper limit, the hydrophilic polymer can be easily dissolved in a solvent at the time of liquid preparation, and production suitability can be enhanced, which is preferable.

Unless it is explicitly stated otherwise, the molecular weight and the degree of dispersion are defined as the values obtained by measurement in accordance with a GPC (Gel Permeation Chromatography). The molecular weight is defined as polystyrene-converted mass-average molecular weight. The gel charged into the column used in the GPC method is preferably a gel having an aromatic compound as a repeating unit, and examples thereof include a gel made of styrene-divinylbenzene copolymers. The column is preferably used in the form where 2 to 6 columns are connected. Examples of a solvent used include ether-based solvents such as tetrahydrofuran, amide-based solvents such as N-methylpyrrolidinone, halogen-based solvents such as chloroform, and aromatic solvent such as 1,2-dichlorobenzene. The measurement is preferably carried out at a flow rate of the solvent in the range of from 0.1 to 2 mL/min, and most preferably in the range of from 0.5 to 1.5 mL/min. By carrying out the measurement within these ranges, there is no occurrence of loading in an apparatus, and thus the measurement can be carried out further efficiently. The measurement temperature is preferably carried out at from 10° C. to 50° C., and most preferably from 20° C. to 40° C. Measurement can also be carried out at 50° C. to 200° C. using a column having a high usable temperature. A column and a carrier to be used can be properly selected, according to the property of a polymer compound to be measured.

[Contact Angle]

In the present invention, the hydrophilicity is not particularly restricted, and after surface modification, a contact angle ($\alpha_s$) with water on an uppermost surface may be defined to be 60 degrees or less, and is preferably 50 degrees or less. The lower limit thereof is not particularly provided, but practically is 4 degrees or more.

As a method of measuring the contact angle with water, a sessile droplet method can be selected. According to the sessile drop method, 1 to 4 μL of water is added dropwise on a membrane surface, and after the dropwise addition, an aspect of a liquid droplet after ten seconds is photographed as an image. On the occasion, contour shape of the image of the liquid droplet is presumed to be a part of circle, a center of the circle is determined, and thus an angle between a tangential line of the circle and a straight line can be determined as the contact angle. According as the necessity, measurement conditions or the like may be set up with reference to JIS R 3257.

A difference ($\alpha_i - \alpha_s$) between a surface contact angle ($\alpha_s$) of water on the hydrophilic layer and a contact angle ($\alpha_i$) of water on a main body of separating layer is not particularly limited, but hydrophilicity of a hydrophilic layer $1a$ to a main body of separating layer $1b$ is preferably relatively enhanced (FIG. 1, FIG. 2). For further quantitatively evaluating the difference, the difference ($\alpha_i - \alpha_s$) between the contact angle ($\alpha_s$) of water on the hydrophilic layer and the surface contact angle ($\alpha_1$) of water on the main body of separating layer upon exposing the surface is preferably 10 degrees or more, and further preferably, 20 degrees or more. Exposure of the surface means that the hydrophilic layer $1a$ is excised so as to tear off from the separating layer $1$, a portion of the main body of separating layer b is further scraped off, and thereby an exposed surface thereof is formed. The contact angle ($\alpha_i$) of water on the above-described main body of separating layer refers to a value obtained by measuring the contact angle of water on the exposed surface, and a measuring method thereof is to be applied in accordance with the above-described method. When ($\alpha_i - \alpha_s$) was less than the range described above, a conspicuous effect on the enhancement of performance and service life was not observed. The upper limit thereof is not particularly limited, but is practically 100 degrees or less.

(Thickness of Hydrophilic Layer and Main Body of Separating Layer)

In the above-described hydrophilic layer of the separating layer, a film thickness $T_1$ (see FIG. 1 and FIG. 2) in a depth direction of a part subjected to modification treatment is preferably 0.5 μm or less, more preferably, 0.2 μm or less, further preferably, 0.1 μm or less, still further preferably, 0.08 μm or less, and particularly preferably, 0.05 μm or less. There are no particular limitations on the lower limit, but when it is considered that the hydrophilic layer is a layer formed of a polymer, the thickness is practically 0.01 μm or more. When this thickness is adjusted to a value less than or equal to the upper limit, it is preferable because the service life can be increased while high gas permeability is maintained.

A thickness of the main body of separating layer is preferably from 0.05 to 20 μm, more preferably from 0.1 to 10 μm. When this thickness is adjusted to a value more than or equal to the lower limit, it is preferable from the viewpoint that foreign materials or defects such as cissing can be reduced, and the performance is stabilized. On the other hand, when the thickness is adjusted to a value less than or equal to the upper limit, it is preferable because the gas permeation performance can be maintained high.

In the present specification, unless otherwise noted, with regard to the membrane thickness or each layer thickness, a whole membrane including the support is frozen in liquid nitrogen, and then a cloven sample, or an ultrathin section sample prepared by cutting the whole membrane with an ultramicrotome or the like is analyzed through observation by TEM and SEM with high magnification.

[Construction Material of Main Body of Separating Layer]

In the gas separation membrane according to the present invention, the main body of separating layer preferably contains a resin, and specific examples of a material applied to this resin include the following materials, but the resin is not necessarily limited thereto. Specifically, the resin preferably includes polyimide resin, polyamide resin, cellulose resin, polydimethylsiloxane resin, and polyethylene glycol resin.

Meanwhile, merely in view of the kind of the resin such as a cellulose resin, there may be overlapping parts with the resins that constitute the hydrophilic layer, but in that case, it is assumed that those used in the hydrophilic layer are imparted with relatively higher hydrophilicity. That is, when cellulose is taken as an example, it can be said that what is appropriate for the hydrophilic layer is hydrophilic cellulose, and what is appropriate for the main body of separating membrane is non-hydrophilic or hydrophobic cellulose. Impartation of hydrophilicity or hydrophobicity may be appropriately achieved by a conventional method, and for example, in order to impart hydrophilicity, a method of using a polymer having a substituent having a polar group such as a hydroxyl group or a carboxyl group in a constituent unit, may be used. On the contrary, in order to increase hydrophobicity, an embodiment of introducing a non-polar substituent such as an alkyl group or an acetyl group into a constituent unit may be mentioned.

More specifically, such resin can be selected as Matrimid sold under the trademark of Matrimid (registered trademark) by Huntsman Advanced Materials LLC (Matrimid (registered trademark) 5218 refers to a specific polyimide polymer sold under the trademark of Matrimid (registered trademark)), polyimides such as P84 or P84HT sold under trade name P84 and trade name P84HT by HP Polymers GmbH, respectively, celluloses such as cellulose acetate, cellulose triacetate, cellulose acetate butyrate, cellulose propionate, ethylcellulose, methyl cellulose and nitrocellulose, polydimethylsiloxanes, polyethylene glycols such as a polymer obtained by polymerizing polyethylene glycol #200 diacrylate (manufactured by SHIN-NAKAMURA CHEMICAL CO., LTD.), and a polymer described in JP-T-2010-513021.

The molecular weight of the resin for forming the main body of separating layer is not particularly limited, but the molecular weight is preferably, as a weight average molecular weight, $1.0 \times 10^4$ to $1.0 \times 10^7$, and more preferably $1.0 \times 10^4$ to $5.0 \times 10^6$. When this molecular weight is adjusted to a value higher than or equal to the lower limit, defects due to cissing or the like can be reduced, and the performance can be stabilized, which is preferable. On the other hand, when the molecular weight is adjusted to a value lower than or equal to the upper limit, the hydrophilic polymer can be easily dissolved in a solvent at the time of liquid preparation, and production suitability can be enhanced, which is preferable.

(Support)

The porous support preferably applied for the support is not particularly limited so long as it satisfies the provision of mechanical strength and high gas permeability, and it may be a porous membrane made of any organic or inorganic substance and is preferably an organic polymer porous membrane. The thickness thereof is preferably from 1 to 3,000 μm, more preferably from 5 to 500 μm, and further preferably from 5 to 300 μm. Regarding this fine pore structure of porous membrane, a mean pore diameter is ordinarily 10 μm or less, preferably 5 μm or less, and more preferably 2 μm or less, and a porosity is preferably from 20% to 90%, and more preferably from 30% to 90%. In addition, the gas permeability is preferably $3 \times 10^{-5}$ cm$^3$ (STP)/cm·sec·cmHg or more, based on carbon dioxide permeation rate. Examples of the material for the porous membrane include conventionally known polymers, including polyolefin-based resins such as polyethylene and polypropylene; fluorine-containing resins such as polytetrafluoroethylene, polyvinyl fluoride, and polyvinylidene fluoride; and various resins such as polystyrene, cellulose acetate, polyurethane, polyacrylonitrile, polyphenyleneoxide, polysulfone, polyethersulfone, polyimide and polyaramide. Among them, from viewpoints of simultaneously attaining high membrane strength, high gas permeability, and separation selectivity, the support is preferably formed of polyacrylonitrile, polysulfone, or polyphenylene oxide. The shape of the porous membrane may be any of plate, spiral, tubular, or hollow fibers.

As mentioned above, this support being a thin and porous raw material is preferred due to capability of securing sufficient gas permeability. Moreover, the support is preferably in a thin membrane and porous form also for maximizing excellent gas separation selectivity of the gas separating layer as mentioned later. On the one hand, when severe reaction conditions such as a high temperature and long time are imposed on shaping of the gas separation membrane, the conditions may occasionally damage the above-mentioned thin and porous support not to allow development of sufficient performance as the composite membrane. From such a viewpoint, the gas separation composite membrane using the radically crosslinkable polyimide compound employed in the present invention can be formed under mild conditions, produce an excellent effect, and develop high performance in both of production competence and product quality.

In the present invention, in order to further provide the membrane with mechanical strength, a support is desirably formed in a lower part of the support for forming the gas separating layer. Specific examples of such a support include a woven fabric, a nonwoven fabric, and a net, and a nonwoven fabric is preferably used in view of membrane-forming properties and cost. As the nonwoven fabric, fibers formed of polyester, polypropylene, polyacrylonitrile, polyethylene, polyamide, or the like may be used alone or in combination with a plurality of fibers. The nonwoven fabric can be produced, for example, by paper making of main fibers and binder fibers that are uniformly dispersed in water, using a cylinder mold, a fourdrinier or the like, and drying the resultant product by a drier. Moreover, the nonwoven fabric is preferably interposed between two rolls and subjected to pressure heating processing for the purpose of removing fluff or improving mechanical properties.

[Mixed Layer]

In regard to the separation membrane of the present invention, it is preferable that the separation membrane have, between the hydrophilic layer and the main body of separating layer, a mixed layer in which a constituent component of the hydrophilic layer and a constituent component of the main body of separating layer are mixed. Preferred examples of the components that constitute the mixed layer include the same components as those mentioned as preferred materials of the hydrophilic layer and the main body of separating layer. The mixing ratio between the constituent components of the hydrophilic layer and the constituent components of the main body of separating layer is not particularly limited, but it is preferable that the mass (w1) of the constituent components of the hydrophilic layer and the mass (w2) of the constituent components of the main body of separating layer be in the following relationship. That is, it is preferable that w1:w2=5:95 to 50:50, and more preferably 5:95 to 40:60.

A thickness $T_2$ of the mixed layer is not particularly limited, preferably from 0.01 to 1 μm, more preferably from 0.01 to 0.5 μm. This mixed layer has a function called performance stabilization by imparting adhesiveness between the hydrophilic layer and the main body of separating layer to the separation membrane, but when the thickness is adjusted to the thickness described above, the function is exhibited more satisfactorily, and thus it is preferable.

[Method of Producing a Gas Separation Membrane]

A gas separation membrane of the present invention preferably is produced by a method of producing which contains a support and a separating layer formed on the support, the separating layer including a hydrophilic layer that is disposed on the far side of the support and contains a hydrophilic polymer, and a main body of separating layer on the support side, the method including:

a step of preparing a solution of the hydrophilic polymer for forming the hydrophilic layer;

a step of preparing a solution of the resin for forming the main body of separating layer; and a step of applying the two liquids by multilayer coating.

(Solution of Hydrophilic Polymer)

Solvent

The solvent that dissolves the hydrophilic polymer is not particularly limited, but it is preferable that he solvent be a hydrophilic solvent. The hydrophilic solvent as used herein refers to a solvent having an SP value of 25 (MPa$^{0.5}$) or more that is listed in Polymer Handbook (p. 688 to 694). Specific examples of the solvent include water; alcohols such as methanol and ethanol; and pyrrolidine.

Concentration

The concentration of incorporating the hydrophilic polymer is not particularly limited, but the concentration is more preferably 0.05% by mass or more, more preferably 0.075% by mass or more, and particularly preferably 0.1% by mass or more. The upper limit is not particularly limited, but is preferably 5% by mass or less, more preferably 2.5% by mass or less, and particularly preferably 1% by mass or less. When this concentration is adjusted to a value more than or equal to the lower limit, film forming can be achieved without any defects caused by cissing or the like, and thus it is preferable. On the other hand, when the concentration is adjusted to a value less than or equal to the upper limit, a thin film can be formed, and thus it is preferable. Meanwhile, according to the present invention, two or more kinds of the hydrophilic polymers described above may be used in combination as long as the effect of the present invention is not impaired, and other additives and the like may also be used.

(Solution of Resin for Main Body of Separating Layer)

Solvent

The solvent that dissolves the resin constituting the main body of separating layer is not particularly limited, but examples include the following:

(1) esters, for example, ethyl acetate, n-butyl acetate, isobutyl acetate, amyl formate, isoamyl acetate, isobutyl acetate, butyl propionate, isopropyl butyrate, ethyl butyrate, butyl butyrate, alkyl esters, methyl lactate, ethyl lactate, methyl oxyacetate, ethyl oxyacetate, butyl oxyacetate, methyl methoxyacetate, ethyl methoxyacetate, butyl methoxyacetate, methyl ethoxyacetate, ethyl ethoxyacetate, 3-oxypropionic acid alkyl esters such as methyl 3-oxypropionate and ethyl 3-oxypropionate; methyl 3-methoxypropionate, ethyl 3-methoxypropionate, methyl 3-ethoxypropionate, ethyl 3-ethoxypropionate, methyl 2-oxypropionate, ethyl 2-oxypropionate, propyl 2-oxypropionate, methyl 2-methoxypropionate, ethyl 2-methoxypropionate, propyl 2-methoxypropionate, methyl 2-ethoxypropionate, ethyl 2-ethoxypropionate, methyl 2-oxy-2-methylpropionate, ethyl 2-oxy-2-methylpropionate, methyl 2-methoxy-2-methylpropionate, ethyl 2-ethoxy-2-methylpropionate, methyl pyruvate, ethyl pyruvate, propyl pyruvate, methyl acetoacetate, ethyl acetoacetate, methyl 2-oxobutanoate, and ethyl 2-oxobutanoate;

(2) ethers, for example, diethylene glycol dimethyl ether, tetrahydrofuran, ethylene glycol monomethyl ether, ethylene glycol monoethyl ether, methyl cellosolve acetate, ethyl cellosolve acetate, diethylene glycol monomethyl ether, and propylene glycol methyl ether acetate; and (3) ketones, for example, methyl ethyl ketone, methyl isobutyl ketone, cyclohexanone, 2-heptanone, and 3-heptanone; and aromatic hydrocarbons, for example, toluene and xylene.

Concentration

The concentration of incorporating the resin constituting the main body of separating layer is not particularly limited, but the concentration is more preferably 0.5% by mass or more, even more preferably 0.75% by mass or more, and particularly preferably 1% by mass or more. The upper limit is not particularly limited, but is preferably 30% by mass or less, more preferably 25% by mass or less, and particularly preferably 20% by mass or less. When this concentration is adjusted to a value more than or equal to the lower limit, film forming can be achieved without having the resin excessively infiltrated into the support, and thus it is preferable. On the other hand, when the concentration is adjusted to a value less than or equal to the upper limit, the liquid viscosity does not increase excessively, and film forming can be achieved while maintaining the coating suitability, which is preferable. Meanwhile, according to the present invention, two or more kinds of the particular monomer described above may be used in combination as long as the effect of the present invention is not impaired, and other additives and the like may also be used.

(Method of Film Formation)

A method of producing a gas separation membrane of the present invention preferably includes:

a step of preparing a solution of the hydrophilic polymer for forming the hydrophilic layer;

a step of preparing a solution of the resin for forming the main body of separating layer; and a step of applying the two liquids by multilayer coating.

According to the present embodiment, it is preferable to provide coating films by preparing the two liquids, and then applying the two liquids on a support by multilayer coating, that is, at appropriate timing and sequence. When a solution of the hydrophilic polymer for forming the hydrophilic layer and a solution of the resin for forming the main body of separating layer are applied simultaneously, it is preferable to carry out the process by applying, on a support, the solution of the resin for forming the main body of separating layer, and then applying thereon the solution of the hydrophilic polymer for forming the hydrophilic layer.

Furthermore, when the liquids are applied in sequence, it is preferable to apply the solution of the resin for forming the main body of separating layer on a support, and to apply the solution of the hydrophilic polymer for forming the hydrophilic layer before the solvent is completely dried.

According to the present embodiment, it is preferable to apply the solution of the hydrophilic polymer for forming the hydrophilic layer, before a dry state in which the solution of the resin for forming the main body of separating layer is applied, and the two liquids are not mixed, is reached. In this manner, the mixed layer described above can be suitably formed, and thus it is preferable. The dry state in which the mixed layer is not generated may not be severe, but it can be considered as a dry state in which formation of the mixed layer is substantially not recognized to the extent that the effect of the mixed layer is not exhibited. When a preferred scope of the dry state is viewed on the basis of the extent of formation of the mixed layer, the dry state may be evaluated based on a preferred range of the thickness of the mixed layer $T_2$ as discussed above. Meanwhile, identification of the mixed layer can be carried out by elemental mapping (Energy Dispersive X-ray Spectroscopy (EDX) or Time-of-Flight Secondary Ion mass Spectrometer [TOF-SIMS]). When independent elements that are present in the upper layer and the lower layer are mapped, it is desirable if the various elements are uniformly dispersed, and in a case in which the elements are dispersed in a sea-island form, or in a case in which elements of any one side only are present, it can be evaluated as a manner that the state is not considered as a mixed layer.

[Method of Separating Gas Mixture]

In the method of separating a gas mixture according to the present invention, as to a method of separating at least one acid gas from a mixed gas containing the at least one acid gas, the acid gas that can be separated by using the gas separation membrane or the gas separation composite membrane of the present invention is preferably carbon dioxide or hydrogen sulfide. Thus, the separation membrane according to the present invention includes a membrane for separating gas (gaseous matter), but may include a separation membrane for critical fluid or the like. Specific examples of target critical fluid include supercritical carbon dioxide.

In the method of separating gas using the separation membrane according to the present invention, a component of a gas mixture being a raw material is not particularly defined, but main components of the gas mixtures are preferably carbon dioxide and methane, or, carbon dioxide and hydrogen. The separating method exhibits particularly excellent performance under the coexistence of carbon dioxide and acid gas such as hydrogen sulfide as the gas mixture, and exhibits excellent performance preferably in separation of carbon dioxide and hydrocarbon such as methane, carbon dioxide and nitrogen, or carbon dioxide and hydrogen. Further, as mentioned above, the present invention can exhibit a high effect in such a case of BTX being contained in the mixed gas to be separated, to maintain good gas separation properties, thereby capable of allowing long life of the membrane.

Above all, a gas to be supplied is preferably a mixed gas of carbon dioxide and methane, a transmission rate of carbon dioxide at 40° C. and 8 atmospheric pressure is preferably more than 5 GPU, more preferably from 5 to 500 GPU. A ratio of transmission rates ($P_{CO2}/P_{CH4}$) of carbon dioxide and methane is preferably 10 or more, more preferably 15 or more.

[Gas Separating Membrane Module and Gas Separation Apparatus]

The gas separation membrane of the present invention is preferably a composite membrane using a porous support in combination, and a gas separating membrane module using the same is more preferred. Moreover, an apparatus for gas separation having means for separating and recovering or separating and purifying gas can be obtained by using the gas separation membrane, the gas separation composite membrane, or the gas separating membrane module of the present invention.

The gas separation membrane of the present invention is preferably used in the form of a module. Examples of the module include spiral, hollow, pleat, tubular, and plate and frame type. Moreover, the polymer membrane of the present invention may be applied to an apparatus for separating and recovering gas using a membrane/absorption hybrid method in conjunction with an absorption solution, for example, as described in JP-A-2007-297605.

EXAMPLES

The present invention will be described in more detail based on the following examples, but the invention is not intended to be limited thereto.

Example 1 and Comparative Example 1

Production of Separation Membrane

A THF (tetrahydrofuran) solution containing 5% by mass of commercially available Matrimid (Matrimid (registered trademark) 5218 refers to a specific polyimide polymer sold under the trademark of Matrimid (registered trademark), manufactured by Huntsman Advanced Materials LLC) was prepared as composition A. An aqueous solution containing 0.1% by mass of commercially available PVA117 (manufactured by Kuraray Co., Ltd., trade name) was prepared as a composition B. A set of these compositions 101a were simultaneously applied via a multilayer coating process on a polyacrylonitrile porous membrane (manufactured by GMT Membrantechnik GmbH, a polyacrylonitrile porous membrane is present on a nonwoven fabric, the film thickness including the nonwoven fabric is about 180 μm) as a support, and was dried. Thereby, a separation membrane 101 was produced (Table 2).

Separation membranes 102 to 104 were produced in the same manner as in the case of the separation membrane 101, except that the composition A and the composition B were changed to the compositions of Table 1 (composition sets 102a, 103a and 104a) (Table 2).

TABLE 1

| | Composition A | | | Composition B | | |
|---|---|---|---|---|---|---|
| Set | Polymer name | Mass % | Solvent | Polymer name | Mass % | Solvent |
| 101a | Matrimid | 5 | MEK | PVA117 | 0.1 | Water |
| 102a | Matrimid | 5 | MEK | PEG | 0.1 | Water |
| 103a | Matrimid | 5 | MEK | Agarose | 0.1 | Water |
| 104a | TAC | 1.5 | MC/MeOH | PVA117 | 0.1 | Water |
| c11a | Matrimid | 5 | MEK | — | — | — |

TAC: Triacetylcellulose (manufactured by Daicel Corporation, Trade name: NAC)
MEK: Methylethylketone
MC/MeOH: Methylene chloride/methanol (Volume ratio 9:1)
PEG: Polyethyleneglycol (manufactured by Sigma-Aldrich Co., Trade name: 81310)
Agarose (manufactured by NIPPON GENE CO., LTD., Trade name: AgaroseH)

A separation membrane c11 was produced in the same manner as in Example 1, except that the composition set c11a of Table 1, which did not use the composition B, was used (Table 2). In addition, a contact angle on a surface of a separating layer in this separation membrane can be evaluated as a surface contact angle of a main body of separating layer upon exposing the surface in ones in Examples.

Kyowa Interface Science Co., LTD.) was used, and thus a surface contact angle was measured (measurement temperature: 25° C.). The results are shown in Table 2.

—Membrane Life—

In the gas separation evaluation 2, a reduction ratio of a separation selectivity after 10 hours was evaluated as a membrane life in the present invention. The results are shown in Table 2.

TABLE 2

| Test sample | Comp. set | SCA (degree) | Layer thickness (μm) | | | Gas separation evaluation 1 | | Gas separation evaluation 2 | | Life |
|---|---|---|---|---|---|---|---|---|---|---|
| | | | HL | ML | MB | TFR $Q(CO_2)$*[1] | S.S. $\alpha$*[2] | TFR $Q(CO_2)$*[1] | S.S. $\alpha$*[2] | (R.R. %) |
| 101 | 101a | 35 | 0.06 | 0.052 | 2.4 | 6.8 | 41.3 | 6.7 | 41.2 | 0.8 |
| 102 | 102a | 39 | 0.05 | 0.033 | 2.4 | 7.2 | 42.5 | 7.2 | 42.6 | 1.3 |
| 103 | 103a | 28 | 0.09 | 0.018 | 2.4 | 5.1 | 41.8 | 5.1 | 41.1 | 2.2 |
| 104 | 104a | 32 | 0.1 | 0.048 | 1.1 | 1.1 | 67.2 | 1.1 | 67.2 | 0.7 |
| c11 | c11a | 92 | — | — | 2.4 | 25.5 | 28.2 | 12.1 | 11.3 | 42 |

Com. set: Composition set
SCA: Surface contact angle
HL: Hydrophilic layer
ML: Mixed layer
MB: Main body of separating layer
TFR: Transmission flow rate
S.S.: Separation selectivity
Life: Membrane life
R.R. %: reduction ratio
*[1]Transmission flow rate unit: $1 \times 10^{-6}$ cm$^3$(STP)/(s · cm$^2$ ·cmHg)
*[2]$\alpha = Q(CO_2)/Q(CH_4)$ —Gas separation Evaluation 1—

Each separation membrane formed as described above was used, and carbon dioxide gas separation performance was evaluated as described below.

Each separation membrane including a support was entirely cut into a piece having a diameter of 47 mm, and the piece was provided with a PTFE membrane filter at the transmission side, to prepare a transmission test sample. To each sample (effective area 2.40 cm$^2$) described above, a mixed gas of $CO_2/CH_4$:50/50 (volume ratio) was fed as a test gas under a relative humidity of 0%, a flow rate of 300 mL/min, a temperature of 40° C., and a total pressure 200 kPa, Ar gas (flow rate 90 mL/min) was allowed to flow at the side of transmission. Gas transmitted through the membrane was analyzed by gas chromatography, and a $CO_2$ transmission rate and a separation factor were calculated. Values thereof are presented in Table 2.

—Gas Separation Evaluation 2—

Separation performance was measured in the same manner as the gas separation evaluation 1 except that the gas composition was adjusted to be $CO_2/CH_4$/BTX:13/86.9/0.1 (volume ratio). Values thereof are presented in Table 2.

BTX: a mixture of benzene, toluene and xylene in an equal amount.

—Layer Thickness Evaluation—

The various separation membranes thus produced were freeze-fractured in liquid nitrogen to thereby obtain membrane cross-sections, and cross-section SEM images were captured and analyzed to evaluate the thicknesses of the hydrophilic layer ($T_1$), the mixed layer ($T_2$), and the main body of separating layer. The results are shown in Table 2.

—Contact Angle Evaluation—

Each separation membrane formed as described above was smoothed, water was used as target liquid, and a contact angle meter (DM-501 [trade name], manufactured by A lower surface contact angle means that the hydrophilicity is higher.

The separation membranes of the present invention had hydrophilic layers imparted with high hydrophilicity, and thus exhibited membrane service lives that had been lengthened to a large extent, together with satisfactory separation selectivity (Examples 101 to 104, see in comparison with Comparative Example c11). From these results, it can be seen that in regard to gas separation in a system containing BTX, the separation membrane of the present invention exhibits high performance, and due to its long membrane service life, the operation cost can be reduced, and also, operations related to maintenance can be improved.

Example 2

Modularization

A spiral module was prepared using the separation membrane prepared in Example 1 with reference to JP-A-5-168869. A separation membrane module prepared according to the present invention (Example) was confirmed to be good as same in the performance of the separation membrane build-in therein.

Having described our invention as related to the present embodiments, it is our intention that the invention not be limited by any of the details of the description, unless otherwise specified, but rather be construed broadly within its spirit and scope as set out in the accompanying claims.

REFERENCE SIGNS LIST

1 Gas separation membrane
  1a Hydrophilic layer
  1b Main body of separating layer
  1c Mixed layer 2 Support (Porous layer)
3 Nonwoven fabric layer
10, 20 Gas separation membrane

The invention claimed is:

1. A gas separation membrane comprising a support and a separating layer formed on the support,
the separating layer comprising a main body and a hydrophilic layer;
the main body being disposed on the side of the support;
the hydrophilic layer being disposed on the farther side away from the support than the main body and comprising a hydrophilic polymer,
wherein the hydrophilic polymer comprises at least one selected from the group consisting of polyvinyl alcohol, polyacrylic acid, polystyrene sulfonic acid, polyacrylamide, polyethylene glycol, polysaccharides, and gelatin; and a resin constituting the main body of separating layer is selected from the group consisting of a polyimide resin, a polyamide resin, a cellulose resin, a polydimethylsiloxane resin, and a polyethylene glycol resin,
said gas separation membrane further comprising a mixed layer between the hydrophilic layer and the main body of separating layer, the mixed layer mixedly comprising the constituent component of the hydrophilic layer and the constituent component of the main body of separating layer, the mixed layer having a thickness of 0.01 µm to 1 µm, and
said gas separation membrane providing a transmission rate ratio of carbon dioxide to methane of 10 or more as applied to separation of a mixed gas containing benzene, toluene and xylene organic components in addition to carbon dioxide and methane.

2. The gas separation membrane according to claim 1, wherein the polysaccharides is agarose, dextran, chitosan or cellulose.

3. The gas separation membrane according to claim 1, wherein the hydrophilic layer has a film thickness of 0.5 µm or less.

4. The gas separation membrane according to claim 1, comprising the hydrophilic layer provided with a surface contact angle measured by using water thereon in the range of 60 degrees or less.

5. The gas separation membrane according to claim 1, wherein a difference ($\alpha_t - \alpha_s$) between a surface contact angle ($\alpha_s$) of water on the hydrophilic layer and a contact angle ($\alpha_t$) of water on the main body of separating layer is 10 degrees or more.

6. The gas separation membrane according to claim 1, wherein the main body of separating layer has a film thickness of 0.05 µm to 20 µm.

7. A gas separating membrane module, comprising the gas separation according to claim 1.

8. The gas separation membrane according to claim 1, wherein the hydrophilic polymer comprises at least one selected from the group consisting of polyvinyl alcohol, polyethylene glycol, and polysaccharides and the resin constituting the main body of separating layer is selected from the group consisting of a polyimide resin and a cellulose resin.

* * * * *